United States Patent [19]
Wilson

[11] Patent Number: 4,905,953
[45] Date of Patent: Mar. 6, 1990

[54] FIFTH WHEEL STABILIZER

[76] Inventor: Jewell Wilson, 3701 Gun Club Rd. C7, Yakima, Wash. 98901

[21] Appl. No.: 253,220

[22] Filed: Oct. 4, 1988

[51] Int. Cl.[4] ............................................. B60S 9/02
[52] U.S. Cl. .................................. 248/352; 280/763.1
[58] Field of Search ............ 248/676, 677, 158, 163.1, 248/176, 188.2, 188.8, 351, 352, 357, 359 E; 280/763.1, 475

[56] References Cited

U.S. PATENT DOCUMENTS

| | | | |
|---|---|---|---|
| 1,030,938 | 2/1912 | Stamps | 248/165 |
| 1,552,901 | 8/1925 | Wengraf | 248/352 |
| 2,519,364 | 8/1950 | Fredholm | 248/352 |
| 2,924,463 | 2/1960 | Livermont | 280/763.1 |
| 3,190,480 | 6/1965 | Maynez | 248/351 |
| 3,198,486 | 8/1965 | Allen | 248/354.1 |
| 3,558,052 | 1/1971 | Hanson | 280/763.1 |
| 3,642,242 | 2/1972 | Danekas | 280/763.1 |
| 3,765,666 | 10/1973 | Chretiennot | 248/351 |
| 3,801,128 | 4/1974 | Herndon | 280/763.1 |
| 3,823,958 | 7/1974 | Trejbal | 280/763.1 |
| 3,933,372 | 1/1976 | Herndon | 280/763.1 |
| 3,970,278 | 7/1976 | Studer | 248/352 |
| 4,268,066 | 5/1981 | Davis | 280/763.1 |
| 4,429,851 | 2/1984 | DeJager | 280/763.1 |
| 4,708,362 | 11/1987 | Raetz | 280/763.1 |

Primary Examiner—Ramon O. Ramirez
Assistant Examiner—Robert A. Olson
Attorney, Agent, or Firm—George A. Cashman

[57] ABSTRACT

An apparatus for limiting the side sway, or yaw, of fifth wheel recreational trailers when such trailers are parked without being attached to the towing vehicle. Such trailers have a steel housing projecting downward below the front, or cantilevered end. This invention includes two steel tubes, each tube having a pipe tee at one end. One tube is placed on each side of the housing with the teed end in the right angle formed by the housing and the trailer body. The bare end of each tube is supported on a separate baseplate. Each baseplate has a knob projecting upwards. The knob fits partway into the tube, and allows the tube on each side of the trailer to adopt a proper supportive position, almost regardless of the unevenness of the ground. The tubes are connected by a chain which is made and kept taut by a turnbuckle.

9 Claims, 5 Drawing Sheets

FIFTH WHEEL STABILIZER

BACKGROUND OF THE INVENTION

1. Field of the Invention

This invention is directed to an apparatus for limiting the side sway of a fifth wheel recreational trailer when the trailer is not being supported by a towing vehicle.

Fifth wheel trailers are supported, when under tow, by a conventional single or dual axle under the back end of the trailer and, under the front end, by a framework in the bed of a pickup truck. The front end of the trailer is a relatively large cantilevered overhang, under which is the fifth wheel strike plate and towing pin. In order to detach the trailer from the pickup, the trailer body is provided with a built-in leg at each forward corner of the full trailer body, just behind the point where the cantilevered overhang begins. These built-in legs are interconnected, and are provided with a jacking arrangement, so that a crank may be inserted into a receptacle in the side of the trailer body, and the legs cranked down to contact the ground. Each of the legs is provided with a series of holes and pins, so that the legs can be adjusted for differing lengths to accommodate uneven ground. When the legs are cranked down to contact the ground, they are cranked further to raise the towing pin and strike plate off the pickup towing structure, and the truck is driven away. The level of the trailer is adjusted by cranking the legs up or down as necessary. The object, of course, is to have the trailer body as level as reasonably possible, for comfortable use of the trailer as living quarters, however temporary. In practice, most, if not all, users of fifth wheel trailers carry one or more planks to place under a rear tire, or under one of the front legs, or both, depending on the unevenness of the ground. Even so, when a trailer is level, as determined by observing the spirit levels attached to the sides and front of the trailer body, fifth wheel trailers are subject to considerable yawing motion when parked, caused by wind forces acting on the overhang forming a moment arm around the front legs, and by lateral forces caused by people moving about inside the trailer.

2. Description of Related Art

The apparatus that is perhaps the most widely used manufactured device for stabilizing fifth wheel trailers, at least in the geographic area where the inventor of the apparatus of this specification resides, is disclosed in U.S. Pat. No. 4,708,362 of Raetz. Raetz discloses a compensator structure which cooperates with the trailer towing pin and strike plate, and which is supported by pivoted legs connected to each other by a tensioning device. The tensioning device draws the legs toward one another, forcing the compensator upward, to take the weight of the front end of the trailer, and achieve a level situation. Each leg has a bolted pivot shoe to adapt the device to uneven ground.

A device for support and stabilization of conventional trailers is disclosed in U.S. Pat. No. 3,558,092. That patent discloses individual legs which are clamped to the trailer frame and towing tongue, and which may be adjusted to any of several lengths by adjustment of a toggle arm. It would appear that the function of the support system is to raise the trailer up off its regular spring suspension system.

SUMMARY OF THE INVENTION

The objective of this invention are to provide an apparatus which will virtually eliminate the side sway of parked fifth wheel trailers, and which is simple to use, light in weight, low in cost, which does not contact the towing pin and strike plate, and which avoids the necessity of operating a highly stressed tensioning device.

All fifth wheel trailers are built with a steel housing surrounding the towing pin and strike plate. The housing includes steel walls extending perpendicularly downward from the trailer frame, on either side of the towing pin and strike plate. The housing is also used to protect electrical wires extending from the trailer electrical system.

The preferred embodiment of this invention comprises two metal tubes, preferably made of steel, each of which is inserted, at one end, into the side outlet of a conventional pipe tee, preferably polyvinyl chloride. The other end of each tube is left bare.

There are two metal baseplates, preferably made of steel. Each baseplate is approximately square, and is provided with a plurality of holes. A hemispherical knob projects upward from the center of each of the baseplates. The diameter of the hemispherical knob is greater than the internal diameter of the tube, so that when the baseplate is placed on the ground, and the bare end of a tube is placed in contact with the knob, the tube can adopt a wide variety of positions with respect to the vertical, even if the baseplate is not itself level. The diameter of the knob must be large enough so that it will not become jammed in the tube, and yet small enough so that the tube will not slip off the surface of the knob when the tube is at an appreciable angle from the vertical. It is believed that the diameter of the knob should be from 110% to 175% of the inner diameter of the tube.

When the trailer is detached from the towing vehicle, it is jacked up on its legs until the front end of the trailer is slightly higher than the back end, as determined by observation of the spirit level which is affixed to the trailer body near the jacking receptacle. One of the tubes is placed with its tee end in the right angle formed by the fifth wheel housing and the trailer frame. The tee itself will control the degree of movement of the tube, so that the tube can be moved only laterally with respect to the trailer centerline, and the user does not have to be particularly concerned about getting the tube properly oriented. A baseplate is placed under the bare end of the tube, with the baseplate knob in contact with the minor circumference of the tube. The baseplate-and-tube assembly is then placed on the ground, and nudged toward the trailer centerline with the user's hand or foot until the trailer-tube-baseplate assembly is snug. The process is repeated on the other side of the housing with the second tube and baseplate. The trailer is then lowered on to the tubes by jacking the trailer legs up. When the front end of the trailer is resting on the tubes, the level of the trailer is usually acceptable. If that is not the case, the trailer can again be raised on its legs, and the tubes adjusted by moving the baseplates toward or away from the trailer centerline, depending on whether the front end of the trailer is to be higher or lower. When the level of the trailer is acceptable, the tubes are joined together to prevent spreading by means of a chain and turnbuckle. Each tube has a pipe clamp bolted to it above its midpoint, with the axis of the bolt being parallel to the axis of the tee at the end of the metal tube. A length of chain hangs from each pipe clamp bolt, between the tabs of the pipe clamp. The lengths of chain are connected by means of a turnbuckle having a hook projecting from each end. The turnbuckle is tightened by hand until the chain is taut, securing the legs together, and preventing their movement, relative to each other.

It will be understood that the chain-and-turnbuckle arrangement could as easily have the turnbuckle suspended from one pipe clamp bolt, and a single length of chain suspended from the other pipe clamp bolt.

The elevation of one baseplate, when in use, can be substantially different from the elevation of the other baseplate, because each tube-and-baseplate assembly is installed separately, and the two tubes are not joined until they are taking the weight, and the trailer is level.- The apparatus is thus suitable for use on uneven ground.

DETAILED DESCRIPTION OF THE INVENTION

This invention comprises two sets of identical elements. For purposes of the first part of this detailed description, only one of each of such elements will be described.

Figure 1:
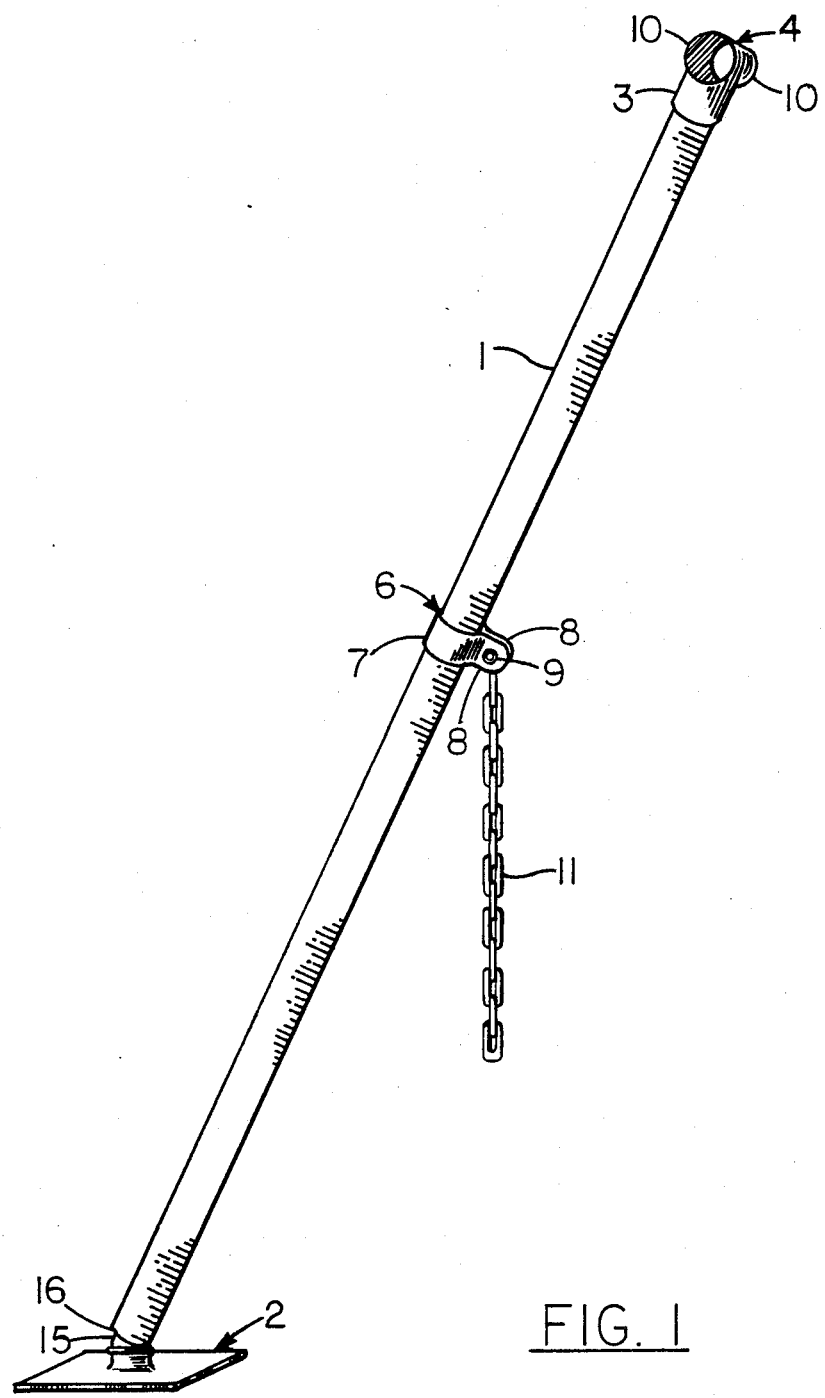
FIG. 1 is a perspective view of a tube and baseplate of this invention, showing the tube in its operative position on the baseplate.

Referring now to the drawings, FIG. 1 illustrates a tube 1 of the preferred embodiment resting on and supported by a baseplate 2 as it would when in use. The tube 1, preferably made of steel, is of a size selected to be as light in weight as possible for easy handling, consistent with its ability to withstand the combined compressive and bending stresses to which it will be subjected. The tube is designed as a medium-length column, which is defined as a column having a slenderness ratio of 30 and 175. For example, the tube 1 of this embodiment has a nominal size of 1¼ inches. The length of the tube 1 is 54 inches (1.37 meters). The radius of gyration of a 1¼-inch steel tube is 0.5399, making the slenderness ratio 100 for all practical purposes.

Figure 2:
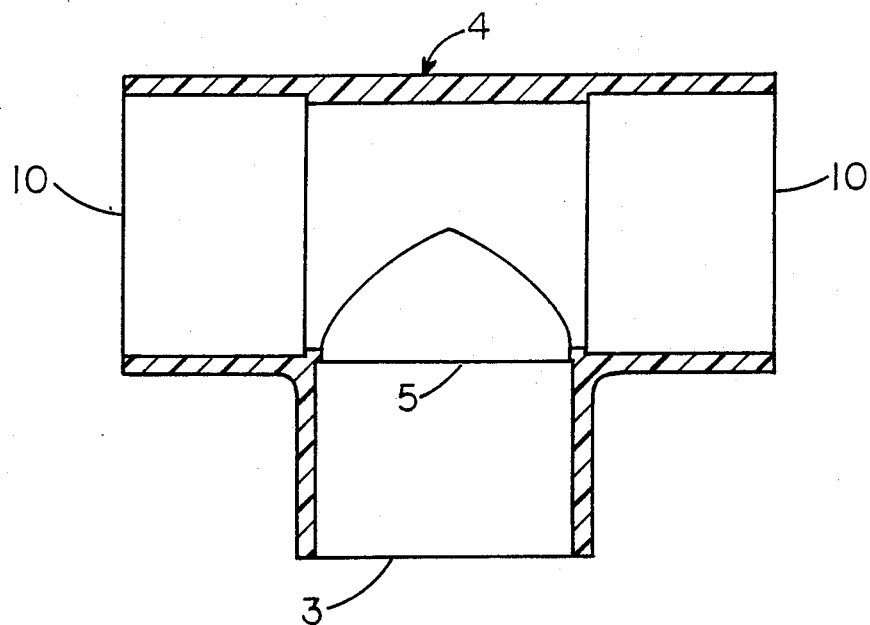
FIG. 2 is a sectional view of a pipe tee used in this invention.

One end of the tube 1 is inserted into the side outlet 3 of a tee 4, which is illustrated in FIG. 2. The tee 4 is a conventional polyvinyl chloride pipe fitting, described nominally, in this embodiment as 1¼×1¼×1¼. Within each opening of the tee 4, and projecting radially inwardly from the inside surface, is a land 5. The purpose of the land 5 is to limit the depth of penetration of a pipe or tube which may be inserted therein. In this invention, the tube 1 is inserted into the side outlet 3 of the tee 4 until it is in contact with the land 5. Use of a 1¼-inch tube in a 1¼ tee, for example, provides a tight sliding fit to a depth of 1¼ inches (31.75 mm.).

A clamp 6, having a band 7 and spaced apart tabs 8 is rigidly attached to the tube 1 by means of a conventional nut and bolt 9. The orientation of the clamp 6 with respect to the tube 1 is such that the axis of the bolt 9 is parallel to the axis of the opposite ends of the tee 4 in which the metal tube 1 is inserted. During assembly of the clamp 6 to the tube 1, the bolt 9 is passed through an end link of a length of chain 11. The end link is fre to rotate around the bolt 9.

Figure 5:
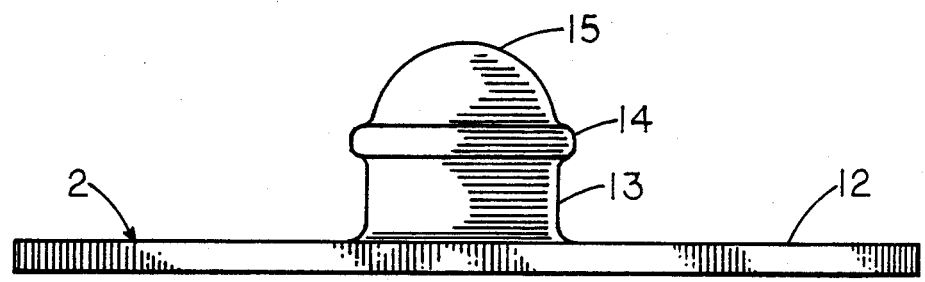
FIG. 5 is an elevational view of a baseplate.
Figure 3:
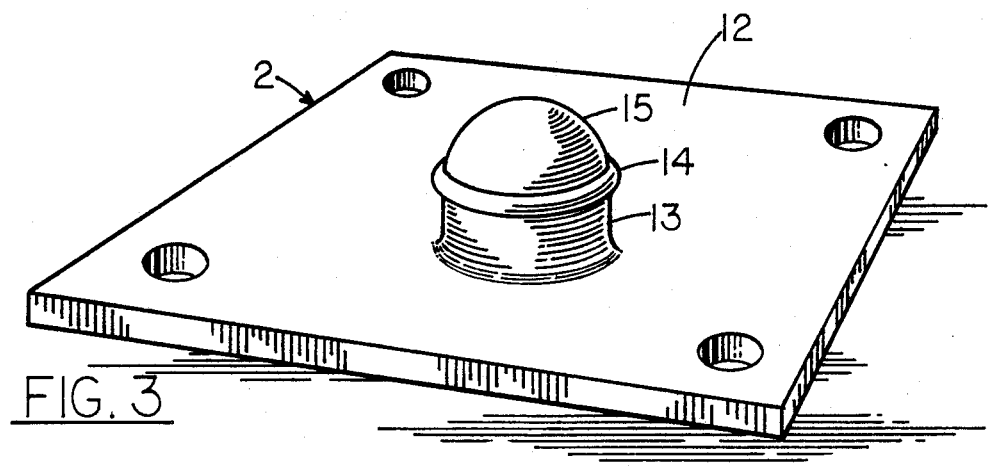
FIG. 3 is a perspective view of a baseplate.
Figure 4:
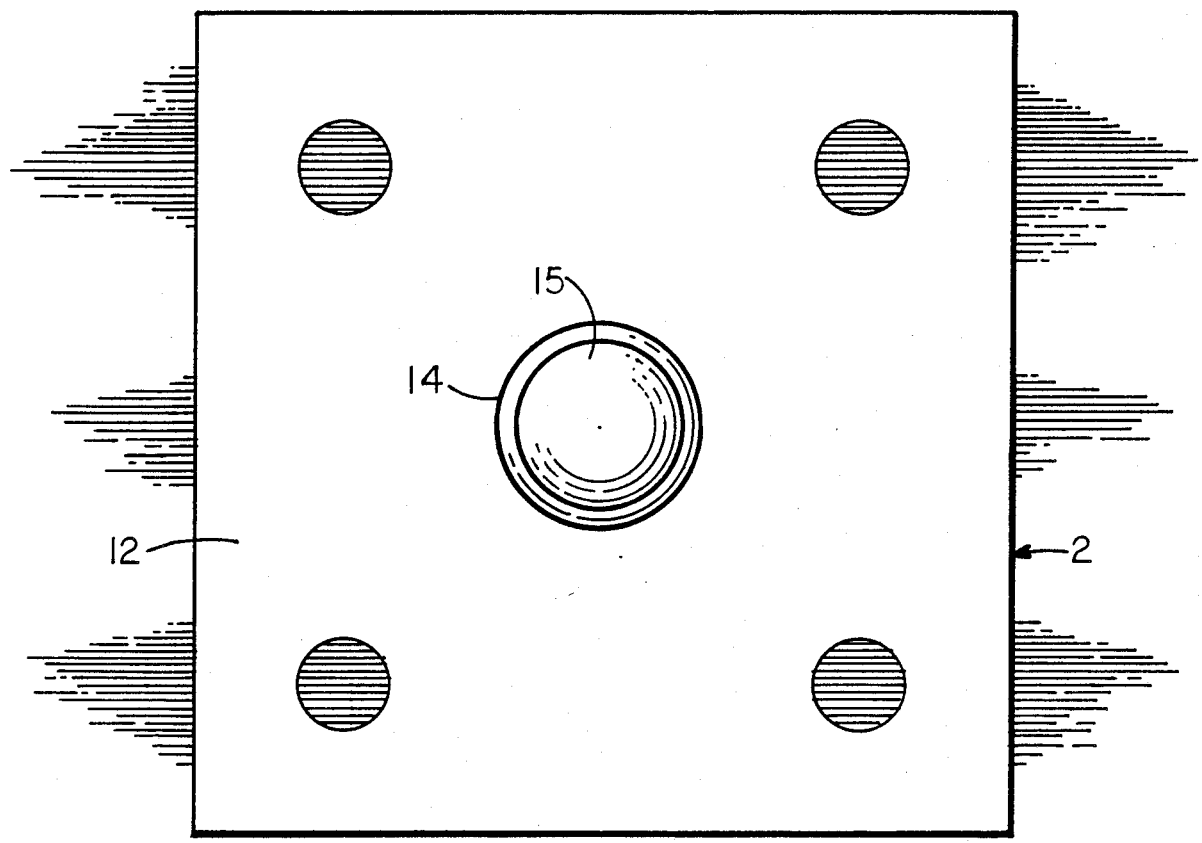
FIG. 4 is a plan view of a baseplate as seen from above.

The baseplate 2 which supports the tube 1 when the invention is in use is illustrated in FIGS. 3, 4 and 5. The baseplate 2 is preferably made of steel, and comprises a plate 12, approximately square in outline, which is furnished with a plurality of holes. The purpose of the holes is to lighten the baseplate 2, and to increase the coefficient of friction between the baseplate 2 and the ground on which it is placed when in use. A short cylinder 13 projects upward from the center of the plate 12. Above the cylinder 13 is a circular flange 14 of greater diameter than the cylinder 13. Atop the circular flange 14 is a hemispherical knob 15. The important consideration as to size of the knob 15 is that it must be larger in diameter than the inner diameter of the tube 1 which it will support. When the minor circumference of the bare end of the tube 1 is in contact with the knob 15, the tube 1 will always be at some angle other than vertical, and the baseplate 2 may well be tilted in a random direction, yet within broad limits, the baseplate 2 will always provide full support for the tube 1.

Figure 6:
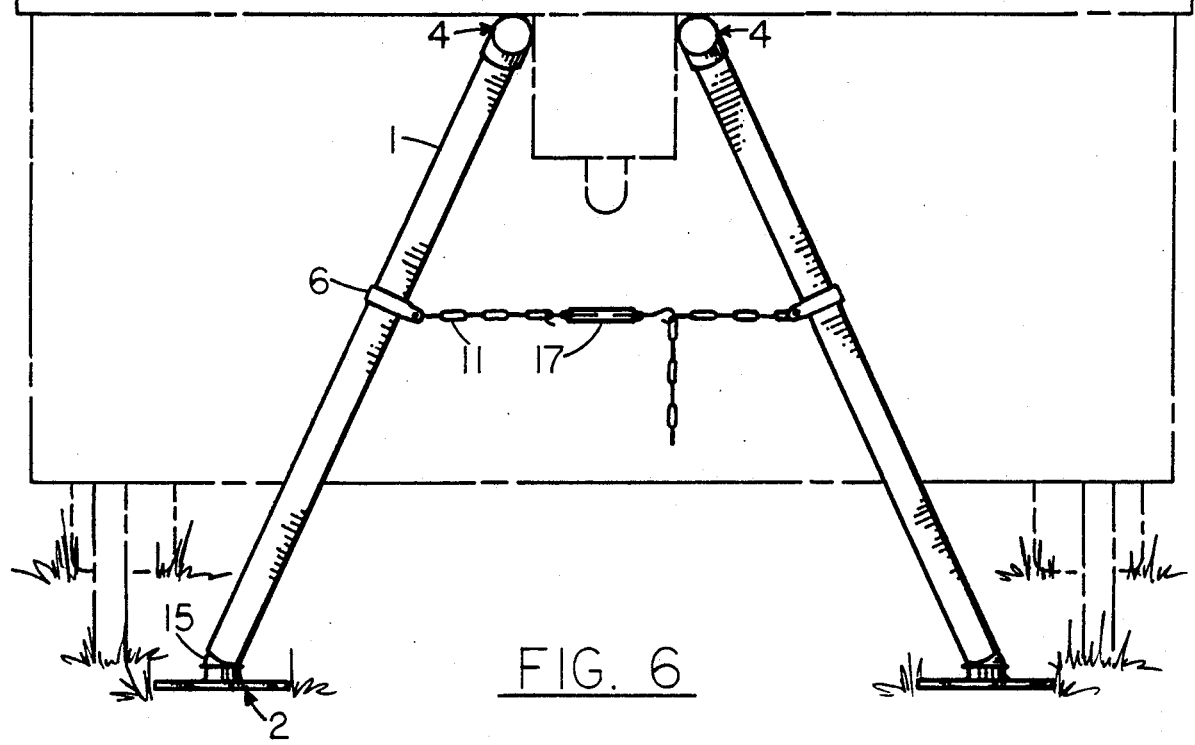
FIG. 6 is an elevational view of the apparatus of this invention supporting and stabilizing a fifth wheel trailer which is shown only in outline.
Figure 7:
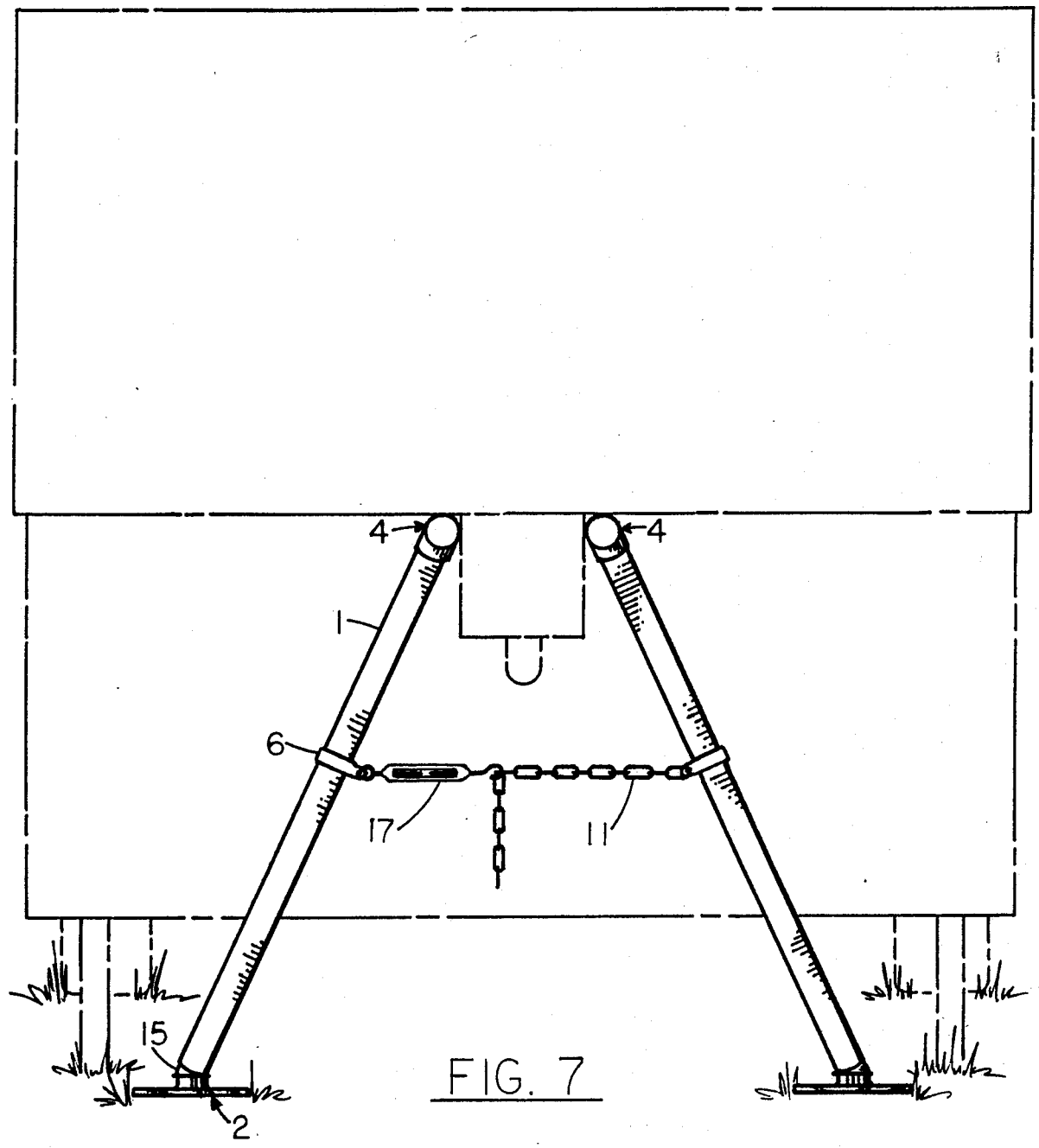
FIG. 7 is similar to FIG. 6, except for the location of a turnbuckle.

As has been stated above, there are two identical sets of elements. There are two baseplates 2 and 2', and two tubes 1 and 1', each tube 1 and 1' being fitted with a tee 4 and 4' and a bolted clamp 6 and 6' from which depends a length of chain 11 and 11'. The completed assembly is shown in FIG. 6, which illustrates tubes 1 and 1' placed on either side of the fifth wheel housing of a trailer, with the tee end of each of the tubes 1 and 1' placed in the right angle formed by the housing and the trailer frame. The bare end of each tube 1 and 1' is supported by a knob 15 and 15' on a baseplate 2 and 2'. The chains 11 and 11' attached to the tubes 1 and 1' are joined by a hook-ended turnbuckle 17 which, when tightened by hand, assists in keeping the tubes 1 and 1' in proper relationship to each other.

I claim:

1. An apparatus for supporting the front end of parked fifth wheel recreational trailers and limiting their horizontal motion, where the trailers have a housing extending downward from the trailer frame and surrounding the towing pin and fifth wheel strike plate, said apparatus comprising:
    (a) two metal tubes, each tube having a cylindrical inner surface, and the exterior of a first end of each tube, being fitted into the perpendicular opening of a tee having cylindrical passageways, the tees being adapted for placement into the right angle formed by the housing and the trailer body at each side of the housing:
    (b) two baseplates, one for each tube, each baseplate comprising a flat metal plate having means for supporting a tube at varying angles relative to the vertical; and
    (c) a detachable means for maintaining the position of the tubes relative to each other when the tubes are in position supporting the trailer.

2. The apparatus of claim 1 wherein each tee is a plastic pipe fitting of the same nominal size as the tube which is inserted into it.

3. The apparatus of claim 1 wherein the means for maintaining the position of the tubes relative to each other comprises:
   (a) two clamps, one such clamp being rigidly bolted to each tube near the midpoint thereof, the axis of the bolt being parallel to the axis of the opposite ends of the tee to which the tube is fitted;
   (b) two lengths of chain, each such chain rotatably depending by an end link from one of the clamp bolts; and
   (c) a turnbuckle having hooked shanks, adapted for connecting the chains and placing tension on them, thereby securing the tubes in a fixed spatial relationship.

4. The apparatus of claim 1 wherein the means for maintaining the position of the metal tubes relative to each other comprises:
   (a) two clamps, one such clamp being rigidly bolted to each tube near the midpoint thereof, the axis of the bolt being parallel to the axis of the opposite ends of the tee to which the tube is fitted;
   (b) one length of chain, rotatably depending by an end link from one of the clamp bolts; and
   (c) a turnbuckle having one shank terminating in an eye by which the turnbuckle rotatably depends from the other clamp bolt, and having its other shank terminating in a hook adapted for connecting to the chain for placing tension thereon, thereby securing the tubes in a fixed spatial relationship.

5. The apparatus of claim 1 wherein the tube support means on the baseplate comprises: (a) a spherical metallic segment rigidly attached to and extending above the upper surface of the baseplate; and (b) the hollow cylindrical inner surface of the tube being of lesser diameter than the spherical segment that engages a second end of the tube which it supports, thus allowing the tube to adopt a wide range of angular positions with respect to the ground.

6. The apparatus of claim 5 wherein the diameter of the spherical segment is from 110% to 175% of the inner diameter of the tube which it supports.

7. The apparatus of claim 5 wherein the flat portion of the baseplate is provided with a plurality of holes for lightening the baseplate and for increasing its coefficient of friction with respect to the ground.

8. An apparatus for supporting the front end of parked fifth wheel recreational trailers and limiting their horizontal motion, where the trailers have a housing extending downward from the trailer frame and surrounding the towing pin and fifth wheel strike plate, said apparatus comprising:
   (a) two metal tubes, each metal tube being fitted into a tee at one end of the metal tube, the tees being adapted for placement into the right angle formed by the housing and the trailer body at each side of the housing;
   (b) two baseplates, one for each tube, each baseplate comprising;
      (i) a flat metal plate; and
      (ii) a spherical metallic segment attached to and extending above the upper surface of the baseplate, the diameter of the spherical segment being greater than the inner diameter of the tube which it supports, thus allowing the tube to adopt a wide range of angular positions with respect to the ground; and
   (c) a detachable means for maintaining the position of the tubes relative to each other when the tubes are in position supporting the trailer; said means comprising:
      (i) two clamps, one such clamp being rigidly bolted to each tube near the midpoint thereof, the axis of the bolt being being parallel to the axis of the opposite ends of the tee to which the tube is fitted;
      (ii) two lengths of chain, each such chain rotatably depending by an end link from one of the clamp bolts; and
      (iii) a turnbuckle having hooked shanks, adapted for connecting the chains and placing tension on them, thereby securing the tubes in a fixed spacial relationship.

9. An apparatus for supporting the front end of parked fifth wheel recreational trailers and limiting their horizontal motion, where the trailers have a housing extending downward from the trailer frame and surrounding the towing plan and fifth wheel strike plate, said apparatus comprising:
   (a) two metal tubes, each tube being fitted into a tee at one end of the metal tube, the tees being adapted for placement into the right angle formed by the housing and the trailer body at each side of the housing;
   (b) two baseplates, one for each tube, each baseplate comprising;
      (i) a flat metal plate; and
      (ii) a spherical metallic segment attached to and extending above the upper surface of the baseplate, the diameter of the spherical segment being greater than the inner diameter of the tube which it supports, thus allowing the tube to adopt a wide range of angular positions with respect to the ground; and
   (c) a detachable means for maintaining the position of the tubes with respect to each other when the tubes are in position supporting the trailer, said means comprising;
      (i) two clamps, one such clamp being rigidly bolted to each tube near the midpoint thereof, the axis of the bolt being parallel to the axis of the opposite ends of the tee to which the tube is fitted;
      (ii) one length of chain, rotatably depending by an end link from one of the clamp bolts; and
      (iii) a turnbuckle having one shank terminating in an eye by which the turnbuckle rotatably depends from the other clamp bolt, and having its other shank terminating in a hook adapted for connecting to the chain for placing tension thereon, thereby securing the tubes in a fixed spatial relationship.

* * * * *